(12) United States Patent
Sekiguchi

(10) Patent No.: US 10,075,490 B2
(45) Date of Patent: Sep. 11, 2018

(54) INFORMATION PROCESSING APPARATUS, ELECTRONIC MEETING SYSTEM, AND PROGRAM

(71) Applicant: Megumu Sekiguchi, Tokyo (JP)

(72) Inventor: Megumu Sekiguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/060,741

(22) Filed: Mar. 4, 2016

(65) Prior Publication Data

US 2016/0191579 A1  Jun. 30, 2016

Related U.S. Application Data

(63) Continuation of application No. 13/969,713, filed on Aug. 19, 2013, now Pat. No. 9,313,239.

(30) Foreign Application Priority Data

Aug. 20, 2012 (JP) .................................. 2012-181551

(51) Int. Cl.
*G06F 15/16* (2006.01)
*H04L 29/06* (2006.01)
*H04L 12/18* (2006.01)

(52) U.S. Cl.
CPC ........ *H04L 65/403* (2013.01); *H04L 12/1831* (2013.01); *H04L 65/4038* (2013.01)

(58) Field of Classification Search
CPC .......................... H04L 12/1831; H04L 65/403; H04L 65/4038
See application file for complete search history.

(56) References Cited

U.S. PATENT DOCUMENTS

| 5,926,605 A * | 7/1999 | Ichimura ............... H04N 5/781 360/72.1 |
| 8,091,029 B1 * | 1/2012 | Gay ...................... G06F 9/4443 715/734 |
| 8,346,589 B1 | 1/2013 | Norton et al. |
| 8,639,236 B2 | 1/2014 | Truskovsky et al. |

(Continued)

FOREIGN PATENT DOCUMENTS

| JP | H10-135949 | 5/1998 |
| JP | 2001-236289 | 8/2001 |

(Continued)

OTHER PUBLICATIONS

Japanese Office Action dated Mar. 15, 2016.
Japanese Office Action dated May 24, 2016.
Japanese Office Action for 2016-216615 dated Oct. 17, 2017.

*Primary Examiner* — Tonia L Dollinger
*Assistant Examiner* — Dixon Dabipi
(74) *Attorney, Agent, or Firm* — IPUSA, PLLC

(57) ABSTRACT

A disclosed information processing apparatus connected with terminals through a network includes a list generating unit receiving a request to acquire a list listing a place registering a material to be shared, and generating the list listing the place allowing presence, a list sending unit sending the list to the terminal sending the request, and a data generating unit receiving a presence request to be present at the place selected from the list, and generating material data for displaying the material registered in the selected place on the terminals, and a data sending unit sending the material data to the terminal sending the presence request, wherein the list generating unit determines the place to be opened or resumed as the place allowing presence, and the data generating unit generates the material data for displaying a hand written memo written in the place and the material registered in the place.

19 Claims, 20 Drawing Sheets

(56) References Cited

U.S. PATENT DOCUMENTS

| | | | |
|---|---|---|---|
| 2002/0002584 A1 | 1/2002 | Takagi et al. | |
| 2006/0206564 A1* | 9/2006 | Burns | H04L 67/38 709/204 |
| 2009/0192845 A1* | 7/2009 | Gudipaty | G06Q 10/10 705/7.19 |
| 2009/0234721 A1* | 9/2009 | Bigelow | G06Q 10/10 705/12 |
| 2009/0300520 A1* | 12/2009 | Ashutosh | H04L 12/1831 715/756 |
| 2010/0049579 A1* | 2/2010 | Suzuki | G06Q 10/06311 705/7.19 |
| 2011/0264745 A1* | 10/2011 | Ferlitsch | H04L 12/1827 709/205 |
| 2012/0150863 A1* | 6/2012 | Fish | G06Q 10/101 707/741 |
| 2013/0271403 A1* | 10/2013 | Nagahara | H04L 12/1813 345/173 |
| 2014/0032677 A1* | 1/2014 | Pittenger | H04L 12/1831 709/205 |
| 2014/0095615 A1* | 4/2014 | Ito | H04L 65/80 709/204 |
| 2015/0378995 A1* | 12/2015 | Brown | H04L 12/1827 707/608 |

FOREIGN PATENT DOCUMENTS

| | | |
|---|---|---|
| JP | 2001-256165 | 9/2001 |
| JP | 2002-259315 | 9/2002 |
| JP | 2010-049456 | 3/2010 |
| JP | 2011-138438 | 7/2011 |
| JP | 2011-191881 | 9/2011 |
| JP | 2012-133493 | 7/2012 |

* cited by examiner

FIG.6

MEETING MANAGEMENT/NEW MEETING REGISTER

● PLEASE INPUT INFORMATION OF MEETING TO BE REGISTERED

MEETING INFORMATION

| MEETING NAME | | ※ INDISPENSABLE |
| --- | --- | --- |
| | | ※ WITHIN SIX CHARACTERS |
| OPEN TIME | 2012.03.20 | 12:00 |
| REMARKS | | |
| MEETING PASSWORD | | RETYPE: |
| SESSION KEY | | RETYPE: |
| MEETING NAME IN MEETING LIST | ● DISPLAY | ○ NOT DISPLAY |
| DOWNLOAD OF MATERIAL | ● PERMIT | ○ NOT PERMIT |
| TURN OF PRESENTER | ● PERMIT | ○ NOT PERMIT |

MEETING MATERIAL

MATERIAL    REMARKS    ORIGINAL FILE    PDF FILE    SHARED MEMO

EDITING MATERIAL ⇒ ～1001

STORE

MEETING MANAGEMENT/NEW MEETING REGISTER/EDITING MATERIAL

● PLEASE ADD MATERIAL TO BE REGISTERED

| | MATERIAL NAME | REMARKS | ORIGINAL FILE |
|---|---|---|---|
| ● | ISSUE 1 STUDIED ON NEAR-FUTURE COLLABORATION | THE RESULT OF STUDY IN 2011 | EXIST |
| ○ | STUDY ON NEAR-FUTURE COLLABORATION (DESIGN) | THE RESULT OF STUDY IN 2012 | EXIST |
| ○ | SCHEDULE FOR DIVISIONS | READ CAREFULLY | EXIST |

ADD ⇑   CHANGE ⇑   DELETE

ENDING CHANGE

MEETING INFORMATION

| MEETING NAME |
| OPEN TIME (SCHEDULED TIME) |
| MEETING PASSWORD |
| SESSION KEY |
| STATUS |
| NEAREST CLOSE TIME |
| MEETING ID |
| ⋮ |

FIG.9

| STATUS NAME | MEANINGS |
|---|---|
| before | COMPLETE REGISTRATION OF MEETING IS ACCOMPLISHED AND MEETING IS READY TO OPEN. |
| ongoing | OBJECTIVE MEETING IS ONGOING. |
| sleeping | STATUS IMMEDIATELY AFTER CLOSING OPENED MEETING. THIS STATUS IS KEPT FOR PREDETERMINED PERIOD, WHILE MEETING CAN BE RESUMED. |
| closing | STATUS AFTER EXPLICIT MEETING IS EXECUTED UNTIL MEETING ACTUALLY ENDS. EVEN IF BEING NEWLY PRESENT AT MEETING, COMMAND FOR CLOSING IS ISSUED, AND PRESENTER TRANSIT LEAVE SCREEN. BY OTHER APPLICATIONS, HANDLED AS ONGOING MEETING |
| keeping | STATE AFTER 24 HOURS OR LONGER IMMEDIATELY AFTER CLOSING OPENED MEETING. THIS STATUS IS KEPT FOR DAYS CORRESPONDING SET VALUE OF KEEPING PERIOD OF SYSTEM. |
| expired | STATE AFTER PASSING DAYS CORRESPONDING TO SET VALUE OF KEEPING PERIOD OF SYSTEM IMMEDIATELY AFTER CLOSING OPENED MEETING. MEETING INFORMATION IN THIS STATE UNDERGOES AUTOMATIC DELETION OR TOTAL DELETION OF MANAGEMENT TOOL. |

FIG.10

MEETING MATERIAL
INFORMATION

| MATERIAL NAME |
| --- |
| ORIGINAL FILE |
| MATERIAL ID |
| MEETING ID |
| ⋮ |

FIG.12

RESERVED MEETING LIST

Reserved Meeting

MEETING STATE: [ALL] [ONGOING] [BEFORE OPENING]

MEETING ID/MEETING NAME: [🔍 SEARCH]

NUMBER OF MEETINGS: 10

| MEETING ID | MEETING NAME | OPEN TIME |
|---|---|---|
| 1438-120622 | test132 | 2012/06/22 21:24 |
| 9975-120622 | test167 | 2012/06/22 21:26 |
| 8390-120622 | WAKITA | 2012/06/22 19:13 |
| 7944-120622 | aaa | 2012/06/22 18:07 |
| 5701-120622 | oni008 | 2012/06/22 15:50 |
| 0460-120622 | AIUEO | 2012/06/22 15:15 |
| 2014-120622 | sekiguchi | 2012/06/22 14:49 |
| 7746-120622 | oni007 | 2012/06/22 14:27 |
| 3050-120622 | oni006 | 2012/06/22 14:02 |
| 3368-120622 | KAKIKUKEKO | 2012/06/22 13:18 |

HANDWRITTEN MEMO DATA

| MATERIAL ID |
| --- |
| X COORDINATE VALUE |
| Y COORDINATE VALUE |
| LINE ID |
| PAGE NUMBER |

INFORMATION PROCESSING APPARATUS, ELECTRONIC MEETING SYSTEM, AND PROGRAM

CROSS-REFERENCE TO RELATED APPLICATIONS

This application is a continuation application filed under 35 U.S.C. 111(a) claiming the benefit under 35 U.S.C. 120 of U.S. patent application Ser. No. 13/969,713 filed on Aug. 19, 2013, which is based upon and claims the benefit of priority of Japanese Priority Patent Application No. 2012-181551 filed on Aug. 20, 2012, the entire contents of which are incorporated herein by reference.

BACKGROUND OF THE INVENTION

1. Field of the Invention

The present invention generally relates to an information processing apparatus, an electronic meeting system, and a program.

2. Description of the Related Art

In a conventional electronic meeting system, memos written by a presenter are stored as accumulated memo data in a server, and the memos written by a participant is stored locally. Therefore, the memos written by the presenter are displayed on the screen for the participant, and the memos written by the participant are displayed only on the screen for the participant as disclosed in, for example, Patent Document 1.

Patent Document 1: Japanese Laid-Open Patent Application No. 2001-256165

SUMMARY OF THE INVENTION

In an electronic meeting system, an organizer of a meeting is required to previously register meeting information or a meeting material before a meeting is opened. Participants of the meeting can be present at the meeting by selecting the meeting whose meeting information is registered. A presenter or a participant can add a memo to a meeting material.

However, in the conventional electronic meeting system, it is necessary to register meeting information or a meeting material for each proceeding of the meeting having continuous proceedings. At this time, the proceedings are treated as different meetings. Therefore, in the meeting having continuous proceedings, there is a problem in that time and effort are required to display a memo added to the meeting material used in the previous proceeding.

In consideration of the above points, objects of embodiments of the present invention are to provide an information processing apparatus, an electronic meeting system, and a program, with which a meeting can be reopened based on meeting information of a closed meeting.

One aspect of the embodiments of the present invention may be to provide an information processing apparatus connected with a plurality of information processing terminals through a network, including a place list generating unit that receives a place list acquisition request for requesting to acquire a place list listing a place where a place material to be shared between the plurality of information processing terminals is registered, and generates the place list listing the place, which allows presence, based on information of the place; a place list sending unit that sends the place list to the information processing terminal which sends the place list acquisition request; a data generating unit that receives a presence request for requesting to be present at the place selected from the place list, and generates place material data for displaying the place material registered in the selected place on the information processing terminals; and a data sending unit that sends the place material data to the information processing terminal which sends the presence request, wherein the place list generating unit determines the place, which can be opened or resumed for the information processing terminals, as the place, which allows presence, based on information of a state of the place included in the information of the place, and wherein the data generating unit generates the place material data for displaying a hand written memo written in the place to be resumed and the place material registered in the place to be resumed on the information processing terminals.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 is an exemplary image chart of a meeting information inputting screen.

FIG. 7 is an exemplary image chart of a meeting material editing screen.

FIG. 8 is an exemplary structural view of meeting information to be registered in a memory unit.

FIG. 9 is an explanatory chart of exemplary statuses of a meeting.

FIG. 10 is an exemplary structural view of meeting information to be registered in a memory unit.

FIG. 12 is an image chart of an exemplary meeting list screen for showing meetings which are opened or allow presence.

FIG. 19 is an exemplary structural view of a handwritten memo data.

DETAILED DESCRIPTION OF THE PREFERRED EMBODIMENTS

A description is given below, with reference to the FIG. 1 through FIG. 20 of embodiments of the present invention. Where the same reference symbols are attached to the same parts, repeated description of the parts is omitted.

Hereinafter, a place is described. As an example of the place, a meeting is described. The place includes the meeting.

Reference symbols typically designate as follows:
1: electronic meeting system;
10: meeting supporting server;
11: client terminal;
21: receiving unit;
22: meeting information registering unit;
23: meeting material registering unit;
24: meeting list generating unit;
25: meeting list sending unit;
26: meeting material generating unit;
27: meeting material sending unit;
28: shared information receiving unit;
29: shared information delivering unit;
30: memory unit;
41: meeting information input receiving unit;
42: meeting material addition receiving unit;
43: sending unit;
44: meeting list requesting unit;
45: meeting list displaying unit;
46: meeting requesting unit;
47: meeting material displaying unit;
48: meeting material operation receiving unit;
49: memo receiving unit;
50: share determining unit;
51: shared information receiving unit;
100: computer;
101: input device;
102: display device;
103: external I/F;
103a: recording medium;
104: RAM (Random Access Memory);
105: ROM (Read Only Memory);
106: CPU (Central Processing Unit);
107: communication I/F;
108: HDD (Hard Disk Drive);
B: bus; and
N1: network.
First Embodiment
<System Structure>

Figure 1:
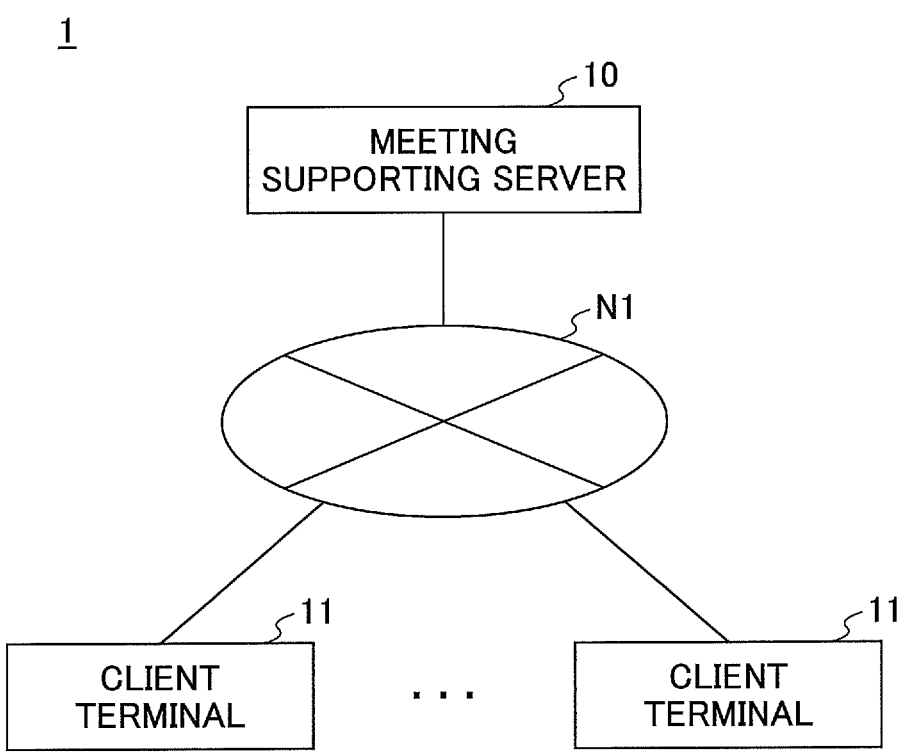
FIG. 1 illustrates an exemplary structure of an electronic meeting system of an embodiment.

FIG. 1 illustrates an exemplary structure of an electronic meeting system of an embodiment. In the electronic meeting system 1 illustrated in FIG. 1, a meeting supporting server 10 and a plurality of client terminals 11 are connected with a network N1 such as a local area network (LAN).

The meeting supporting server 10 may provide a software function or a service which is operated in a plurality of computers or the software function or the service which is operated in one computer. The meeting supporting server 10 may provide, for example, a cloud service.

The meeting supporting server 10 performs various processes for supporting a meeting. For example, the meeting supporting server 10 receives registers of meeting information or meeting materials from the client terminal 11. Further, the meeting supporting server 10 sends a meeting list of meetings which can be opened or allow presence, a meeting material of a meeting which is opened or allows presence, a shared memo, and so on to the client terminal 11.

The client terminal 11 is an information processing terminal operated by an organizer of the meeting or a participant of the meeting. The client terminal 11 is, for example, a desktop personal computer, a notebook computer, a tablet PC, a smartphone, or the like. The client terminal 11 receives an input of meeting information or an addition of a meeting material from the participant of the meeting. Further, the client terminal 11 receives a selection of the meeting from the organizer or the participant of the meeting and displays the meeting material of the selected meeting. The client terminal 11 receives an operation such as turning of a page in the meeting material or the like. The client terminal 11 receives an operation such as writing of a memo in the meeting material or the like.

The client terminal 11 determines whether the operation of the meeting material, the written memo on the meeting material, or the like is shared information, which is required to be shared by the organizer of the meeting and the participant of the meeting. If the operation of the meeting material, the written memo on the meeting material, or the like is determined to be the shared information, the operation of the meeting material, the written memo on the meeting material, or the like is sent to the meeting supporting server 10 as the shared information. Further, the client terminal 11 causes the operation, the written memo, or the like given onto the meeting material, to be reflected on the meeting material, which is being displayed, based on the shared information received from the meeting supporting server 10.

<Hardware Structure>

Figure 2:
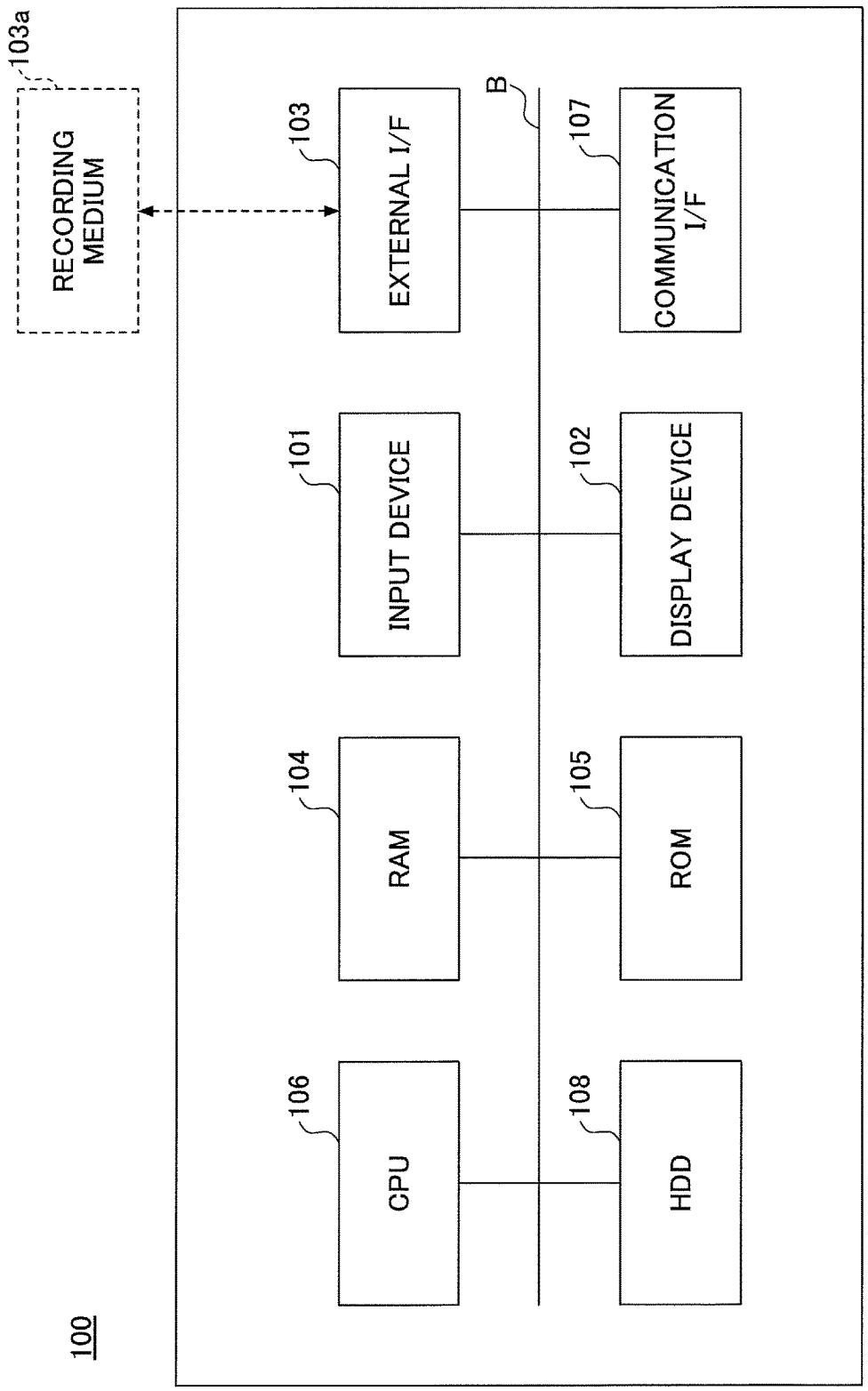
FIG. 2 illustrates an exemplary hardware structure of a computer of the embodiment.

The meeting supporting server 10 and the client terminal 11 are substantialized by the computer 100 having a hardware structure illustrated in, for example, FIG. 2.

FIG. 2 illustrates an exemplary hardware structure of a computer of the embodiment. Referring to FIG. 2, the computer 100 includes an input device 101, a display device 102, an external I/F 103, a random access memory (RAM) 104, a read only memory (ROM) 105, a central processing unit (CPU) 106, a communication I/F 107, and a hard disk drive (HDD) 108, which are mutually connected via a bus B.

The input device 101 includes a keyboard, a mouse, and so on, which are used to input various operation signals to the computer 100. The display device 102 includes a display or the like to display a processing result obtained by the computer 100.

The communication I/F 107 is an interface provided to connect the computer 100 with the network N1. Thus, the computer 100 can perform data communication with another computer 100 through the communication I/F 107.

The HDD 108 is a non-volatile memory device storing programs and data. The stored program and data are an operating system (OS), which is basic software controlling the entire computer 100, application software providing various functions in the OS, and so on. Further, the HDD 108 manages the stored program and the stored data using a predetermined file system and/or a predetermined data base (DB).

The external I/F 103 is an interface with an external apparatus. The external device is a recording medium 103a or the like. With this, the computer 100 can read information from the recording medium 103a and/or write information to the recording medium 103a through the external I/F 103. The recording medium 103a includes a flexible disk, a Compact Disk (CD), a Digital Versatile Disk (DVD), an SD memory card, a Universal Serial Bus (USB) memory, or the like.

The ROM 105 is a non-volatile semiconductor memory (a memory device) which can keep a program and/or a data even when the ROM 105 is powered off. The ROM 105 stores programs and data for a Basic Input/Output System (BIOS), OS setup, network setup, or the like, which are executed at a time of booting up the computer 100. The RAM 104 is a volatile semiconductor memory (a memory device) temporally keeping the program and/or the data.

The CPU 106 reads the program and/or data from the memory device such as the ROM 105, the HDD 108, or the like. The read program or the read data undergo the process to thereby substantialize a control or functions of the entire computer 100.

The meeting supporting server 10 and the client terminal 11 can substantialize various processes to be described below by executing programs in the computer having the above-described hardware structure.

<Software Structure>

<<Meeting Supporting Server 10>>

Figure 3:
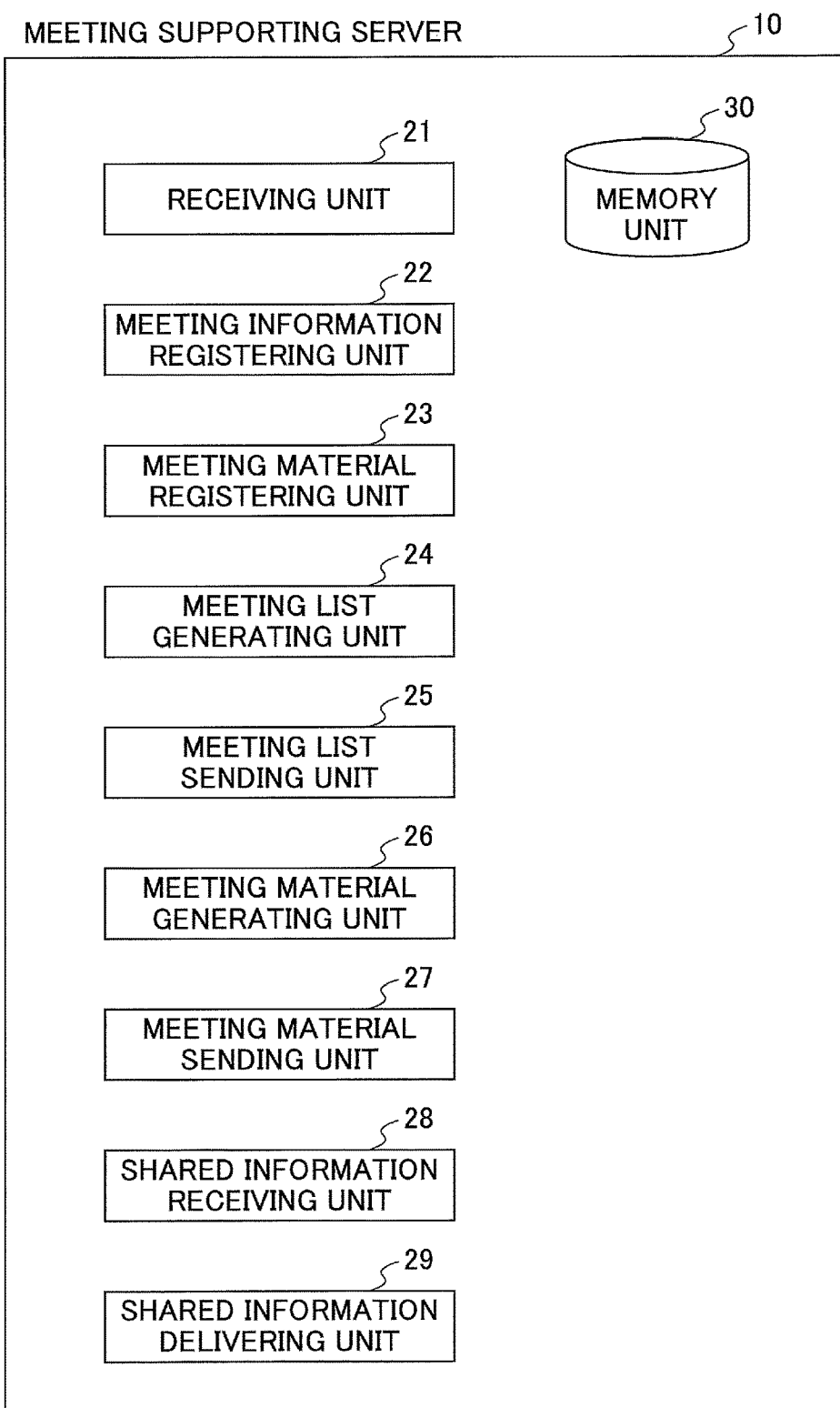
FIG. 3 is an exemplary processing block chart of a meeting supporting server of the embodiment.

FIG. 3 is an exemplary processing block chart of a meeting supporting server of the embodiment. The meeting supporting server 10 substantializes a receiving unit 21, a meeting information registering unit 22, a meeting material registering unit 23, a meeting list generating unit 24, a meeting list sending unit 25, a meeting material generating unit 26, a meeting material sending unit 27, a shared information receiving unit 28, a shared information delivering unit 29, and a memory unit 30 by executing the program.

The receiving unit 21 receives the meeting information and/or meeting material information from the client terminal 11. The meeting information registering unit 22 registers the received meeting information in the memory unit 30. The meeting material registering unit 23 registers the received meeting material in the memory unit 30. The meeting list generating unit 24 generates a meeting list of meetings, which are opened or allow presence. A meeting list sending unit 25 sends the meeting list of the meetings, which are opened or allow presence, to the client terminal 11.

The meeting material generating unit 26 generates a meeting material for the meeting selected by the organizer and/or the participant of the meeting. The meeting material sending unit 27 sends the generated meeting material for the meeting selected by the organizer and/or the participant of the meeting to the client terminal 11. The shared information receiving unit 28 receives shared information such as an operation of the meeting material, a written memo on the meeting material, or the like from the client terminal 11. The shared information delivering unit 29 sends the shared information to another client terminal 11. The memory unit 30 stores the meeting information, the meeting material information, display control information (described later), or the like.

<<Client Terminal 11>>

Figure 4:
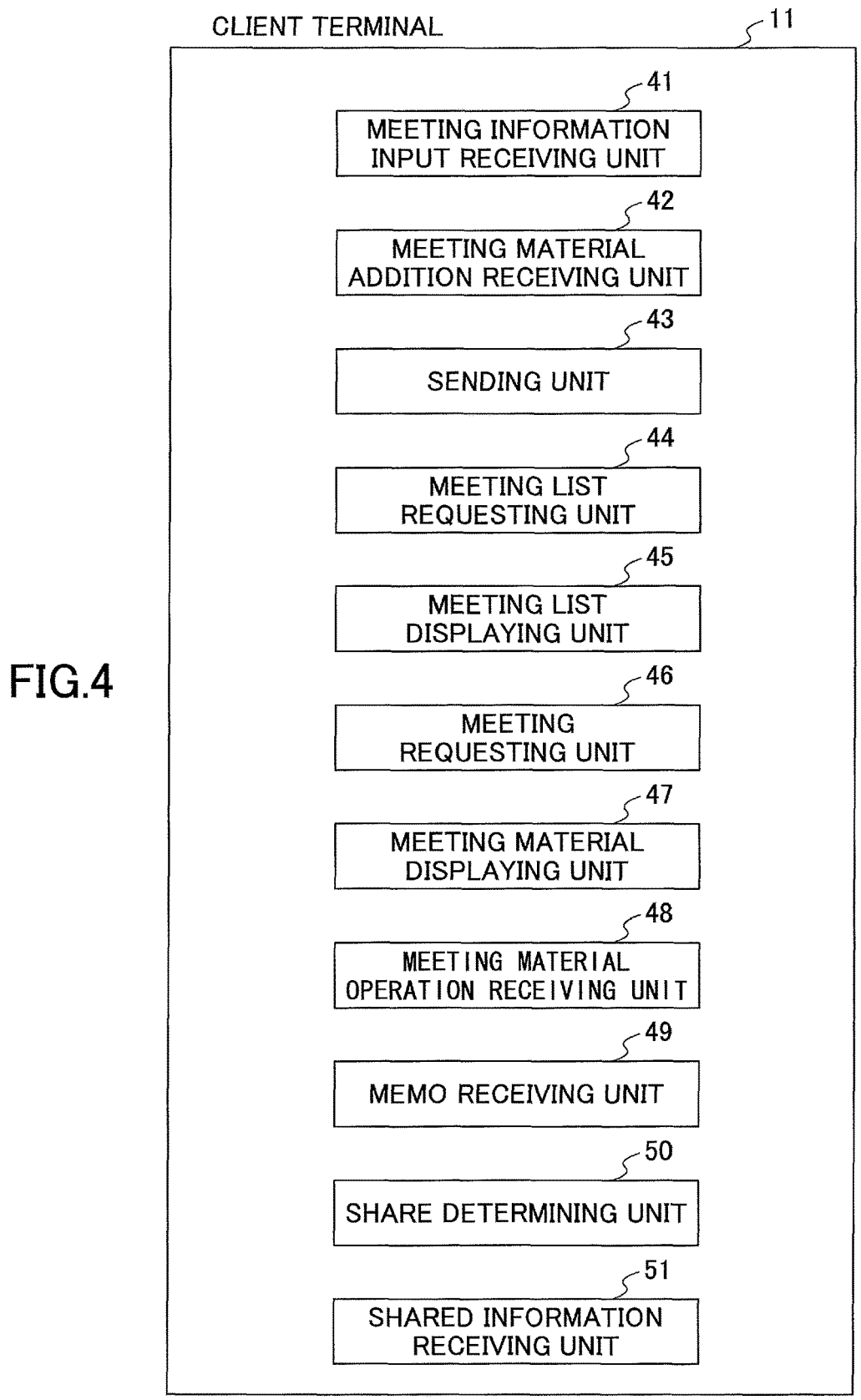
FIG. 4 is an exemplary processing block chart of a client terminal of the embodiment.

FIG. 4 is an exemplary processing block chart of the client terminal of the embodiment. The client terminal 11 of FIG. 4 substantializes a meeting information input receiving unit 41, a meeting material addition receiving unit 42, a sending unit 43, a meeting list requesting unit 44, a meeting list displaying unit 45, a meeting requesting unit 46, a meeting material displaying unit 47, a meeting material operation receiving unit 48, a memo receiving unit 49, a share determining unit 50, and a shared information receiving unit 51 by executing the program.

The meeting information input receiving unit 41 receives an input of the meeting information from the organizer of the meeting. The meeting information addition receiving unit 42 receives an addition of the meeting material from the organizer of the meeting. The sending unit 43 sends the meeting information and the meeting material information to the meeting supporting server 10. The meeting list requesting unit 44 requests a meeting list of meetings, which are opened or allow presence. The meeting list displaying unit 45 displays a meeting list of meetings, which are opened or allow presence.

The meeting requesting unit 46 requests the meeting material for the meeting selected by the organizer and/or the participant of the meeting. The meeting material displaying unit 47 displays the meeting material for the meeting selected by the organizer and/or the participant of the meeting. The meeting material operation receiving unit 48 receives the operation such as turning of the page of the meeting material or the like from the organizer and/or the participant of the meeting. The memo receiving unit 49 receives writing of a memo on the meeting material from the organizer and/or the participant of the meeting. The client terminal 50 determines whether the operation of the meeting material, the writing of the memo on the meeting material, or the like is shared information, which is required to be shared by the organizer of the meeting and the participant of the meeting. If the operation of the meeting material, the written memo on the meeting material, or the like is determined to be the shared information, the operation of the meeting material, the written memo on the meeting material, or the like is sent to the meeting supporting server 10 as the shared information. The shared information receiving unit 51 reflects the operation of the meeting material, the written memo on the meeting material, or the like on the meeting material displayed by the meeting material displaying unit 47 based on the received shared information received from the meeting supporting server 10.

<Detailed Process>

Hereinafter, a detailed process of the electronic meeting system 1 of the embodiment is described.

<<Register Process>>

Figure 5:
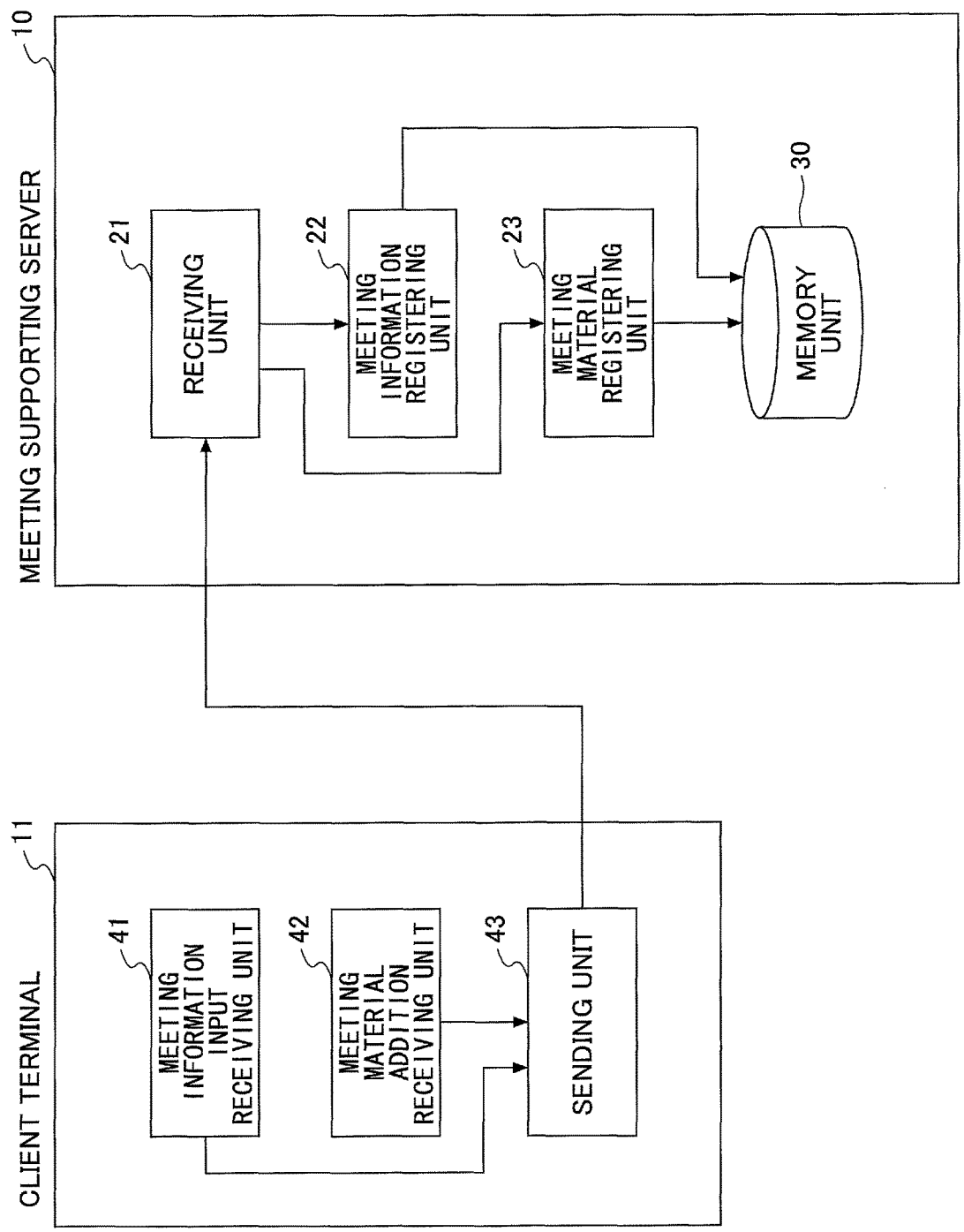
FIG. 5 is an exemplary explanatory view of illustrating a process flow of registering meeting information and a meeting material.

FIG. 5 is an exemplary explanatory view of illustrating a process flow of registering the meeting information and the meeting material. The meeting information input receiving unit 41 displays a meeting information inputting screen 1000 as illustrated in FIG. 6 so that the meeting information is received from the organizer of the meeting.

FIG. 6 is an exemplary image chart of the meeting information inputting screen. The organizer of the meeting can input the meeting information in the meeting information inputting screen 1000 illustrated in FIG. 6. As an example of the meeting information, a meeting name, an open time, remarks, a meeting password, a session key, information indicating whether the meeting is displayed in the meeting list, information indicating whether a download of the meeting material is permitted, information indicating whether a replacement of the presenter is permitted, or the like is input into the meeting information inputting screen 1000.

A button 100 of editing material is included in the meeting information inputting screen 1000. When the button 1001 of editing material is pushed by the organizer of the meeting, the meeting material addition receiving unit 42 displays a meeting material editing screen 1010 as illustrated in FIG. 7 and receives an addition of the meeting material from the organizer of the meeting.

FIG. 7 is an exemplary image chart of the meeting material editing screen. The organizer of the meeting can add the meeting material using the meeting material editing screen 1010. The meeting material editing screen 1010 receives a change, a deletion, or the like besides the addition of the meeting material. The meeting material editing screen 1010 shows an example of inputting the material name, the remarks, the original file, or the like as an example of the meeting material information.

The sending unit 43 sends meeting information received by the meeting information input receiving unit 41 from the organizer of the meeting and meeting material information received by the meeting material addition receiving unit 42 from the organizer of the meeting to the meeting supporting server 10.

The receiving unit 21 of the meeting supporting server 10 receives the meeting information and the meeting material information from the client terminal 11. The meeting information registering unit 22 registers the meeting information illustrated in FIG. 8 based on the meeting information received from the client terminal 11.

FIG. 8 is an exemplary structural view of the meeting information registered in the memory unit 30. The meeting information illustrated in FIG. 8 is obtained by adding a status, a nearest close time, a meeting ID, and so on to the meeting information received by the client terminal 11. The status indicates the state of the meeting as described below. The nearest close time indicates a date and a hour when the most recently opened meeting closes. The meeting ID is identification information uniquely identifying the meeting.

FIG. 9 is an explanatory chart of exemplary statuses of the meeting. The statuses are before, ongoing, sleeping, closing, keeping, and expired. The meanings of the statuses are as illustrated in FIG. 9. When the status is sleeping, the meeting whose status is sleeping can be reopened.

FIG. 10 is an exemplary structural view of the meeting material information registered in the memory unit 30. The meeting material information illustrated in FIG. 10 is obtained by adding a material ID, a meeting ID, or the like to the meeting material information received from the client terminal 11. The material ID is identification information uniquely identifying the meeting material. The meeting information illustrated in FIG. 8 and the meeting material information illustrated in FIG. 10 are associated by the meeting ID.

By the register process for registering the meeting information and the meeting material illustrated in FIG. 5, the meeting information input by the organizer of the meeting and the meeting material information input by the organizer of the meeting are stored in the memory unit 30 of the meeting supporting server 10.

<<Processes of Opening a Meeting and of being Present at the Meeting>>

Figure 11:
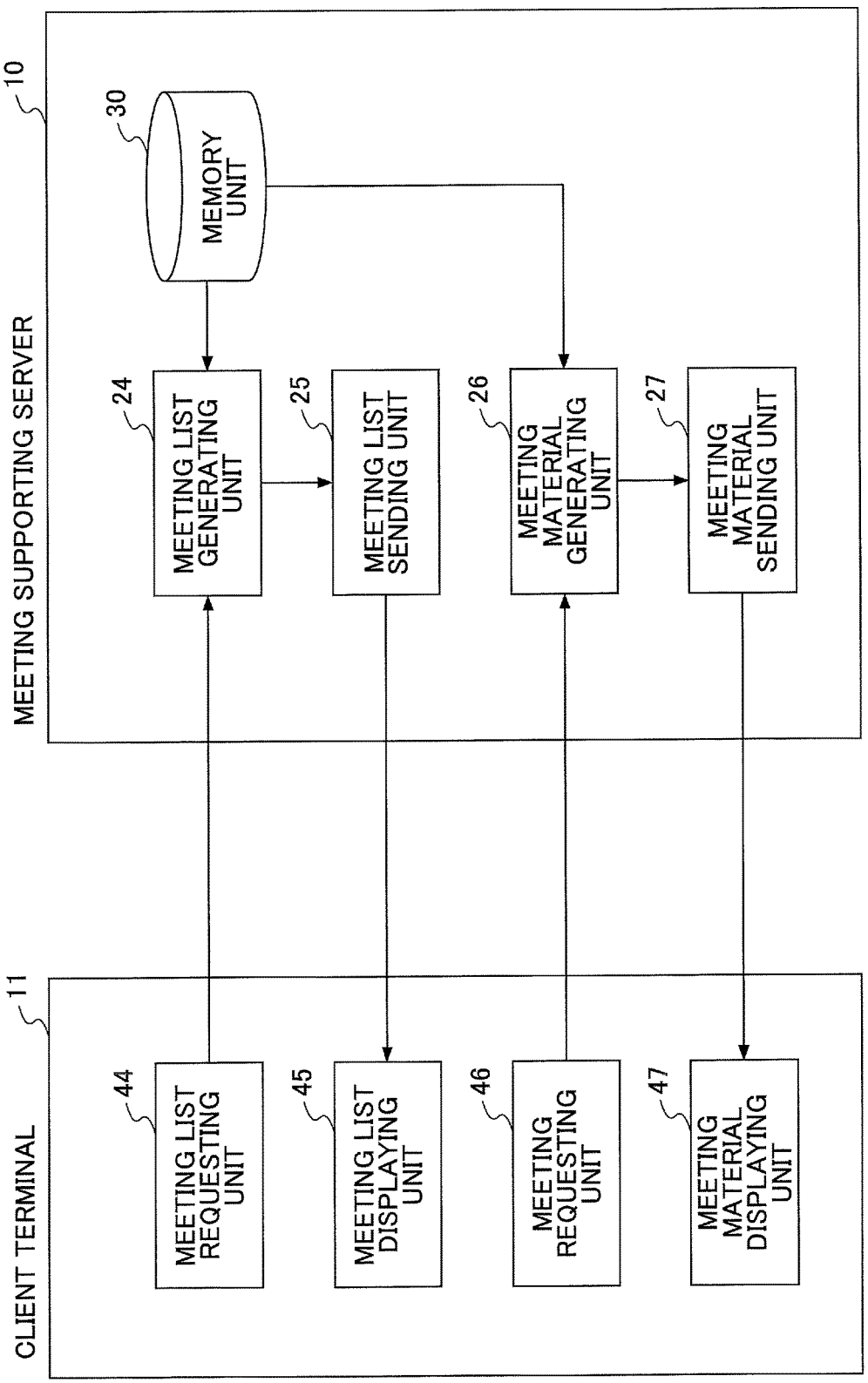
FIG. 11 is an explanatory diagram illustrating a processing flow of opening a meeting and being present at the meeting.

FIG. 11 is an explanatory diagram illustrating a process flow of opening a meeting and being present at the meeting. The meeting list requesting unit 44 receives a display request for a meeting list of meetings, which are opened and allow presence, from the organizers of the meetings or the participants of the meetings. The organizers of the meetings or the participants of the meetings can request a display of the meeting list of the meetings, which are opened or allow presence, by starting up an application program of the electronic meeting system 1. The meeting list requesting unit 44 requests the meeting list of the meetings, which are opened or allow presence, to the meeting supporting server 10.

When the meeting list generating unit 24 receives a request for the meeting list from the client terminal 11, the meeting list generating unit 24 refers to status of the meeting information stored in the memory unit 30 and generates the meeting list of the meetings, which are opened or allow presence. The meeting list generating unit 24 generates the meeting list of the meetings, which are opened or allow presence, using, for example, the meeting information of the meetings whose status is before, ongoing, and sleeping. The meeting list sending unit 25 sends the meeting list of the meetings, which are opened or allow presence, to the client terminal 11.

The meeting list displaying unit 45 displays the meeting list received from the meeting supporting server 10 as illustrated in, for example, FIG. 12. FIG. 12 shows an exemplary image of the meeting list of the meetings, which are opened or allow presence. On the meeting list screen 1020, the meetings, which are opened or allow presence, are listed. The organizers of the meetings and the participants of the meetings can check the meetings, which are opened or allow presence, by referring to the meeting list screen 1020.

If the organizer or the participant finds the meeting, which is opened or allow presence, the organizer or the participant can select the meeting on the meeting list screen 1020. If a meeting password or a session key is necessary for opening the meeting or being present at the meeting, the organizer or the participant inputs the meeting password or the session key upon a request from the client terminal 11. The meeting requesting unit 46 requests the meeting material for the meeting selected by the organizer and/or the participant of the meeting.

The meeting material generating unit 26 refers to the meeting information and the meeting material information, which are stored in the memory unit 30, and generates the meeting material of the meeting selected by the organizer and/or the participant as described below. At this time, the meeting material generating unit 26 generates display control information as illustrated in FIG. 13 and stores the generated display control information in the memory unit 30.

Figure 13:
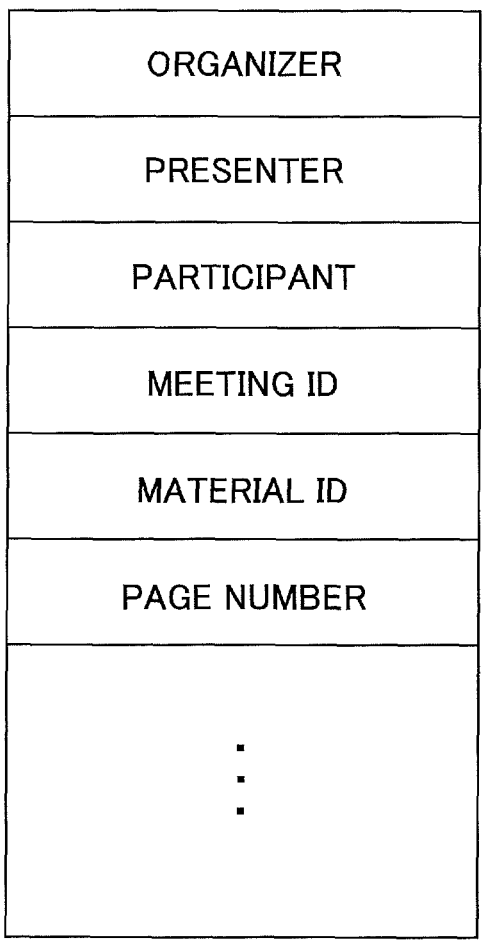
FIG. 13 is an exemplary structural view of display control information.

FIG. 13 is an exemplary structural view of display control information. The display control information illustrated in FIG. 13 includes information of an organizer, a presenter, a participant, a meeting ID, a material ID, a page number, or the like. Because the presenter may be allowed to be replaced, the display control information includes the information indicative of the presenter. Further, the participants share the operation such as turning of page by the presenter, the display control information includes information indicative of which page is displayed by the client terminal 11.

The meeting material sending unit 27 sends the meeting material for the meeting selected by the organizer and/or the participant of the meeting to the client terminal 11. The meeting material displaying unit 47 displays the meeting material for the meeting selected by the organizer and/or the participant of the meeting.

By the processes of opening the meeting and being present at the meeting illustrated in FIG. 11, the organizer of the meeting or the participant of the meeting can select the meeting from the meeting lists of the meetings, which are opened or allow presence. The meeting material of the selected meeting can be displayed on the client terminal 11.

Figure 14:
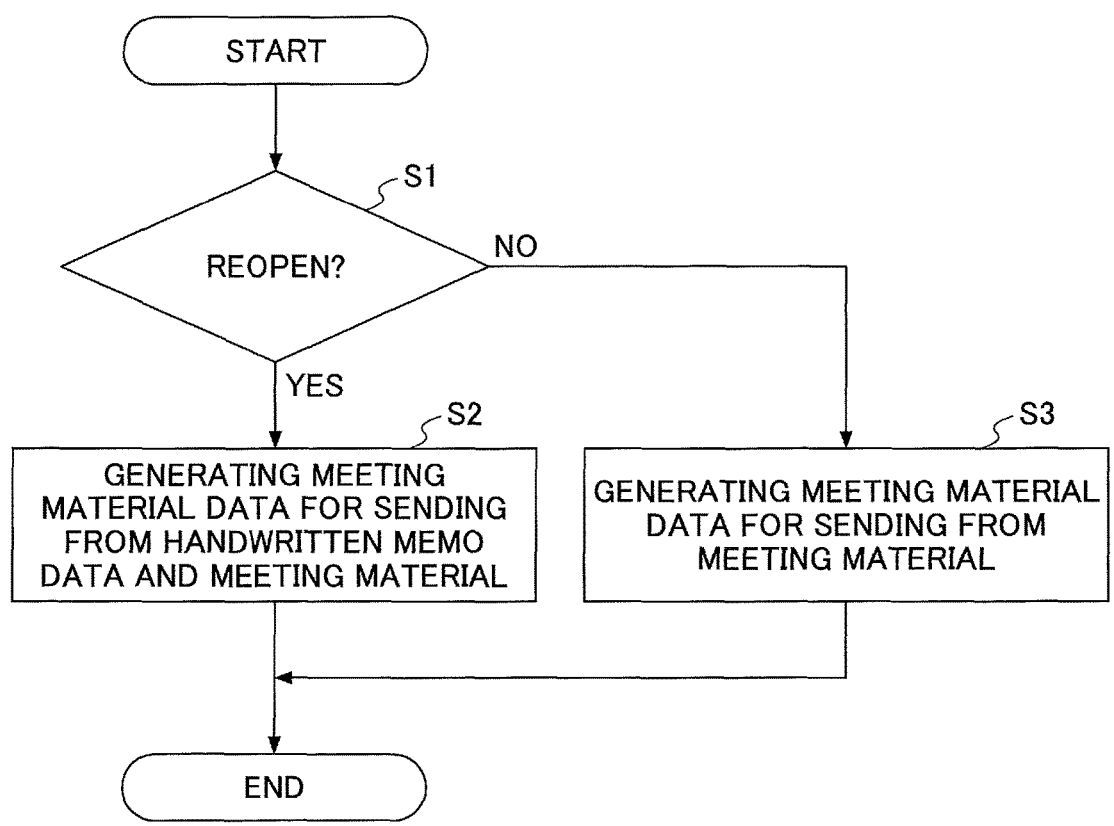
FIG. 14 is an exemplary flow chart of a meeting material generating process.

Furthermore, a meeting material generating process performed by the meeting material generating unit 26 is described. FIG. 14 is an exemplary flow chart of the meeting material generating process. The process of the flowchart illustrated in FIG. 14 is performed for each meeting information.

In step S1, the meeting material generating unit 26 refers to the status of the meeting information stored in the memory unit 30, and determines whether the meeting has been reopened. The meeting material generating unit 26 performs the process of step S3 if the meeting is not reopened. In step S3, the meeting material generating unit 26 refers to the meeting information and the meeting material information, which are stored in the memory unit 30, and generates a meeting material data of the meeting selected by the organizer and/or the participant. The meeting material data is provided for sending to the organizer and/or the participant.

The meeting material generating unit 26 performs the process of step S2 if the meeting is reopened. In step S2, the meeting material generating unit 26 generates the meeting material data of the meeting selected by the organizer and/or the participant of the meeting based on the meeting information stored in the memory unit 30, the meeting material information stored in the memory unit 30, and a handwritten memo (stroke) data to be described below. The meeting material data is generated in a format type for, for example, an electronic document. As an example of the format type for the electronic document is Portable Document Format (PDF) ("Portable Document Format (PDF)" is a registered trademark).

The meeting material of the reopened meeting includes the written memo on the meeting material received from the presenter in the closed meeting by the meeting material generating process illustrated in FIG. 14.

<<Edit Process>>

Figure 15:
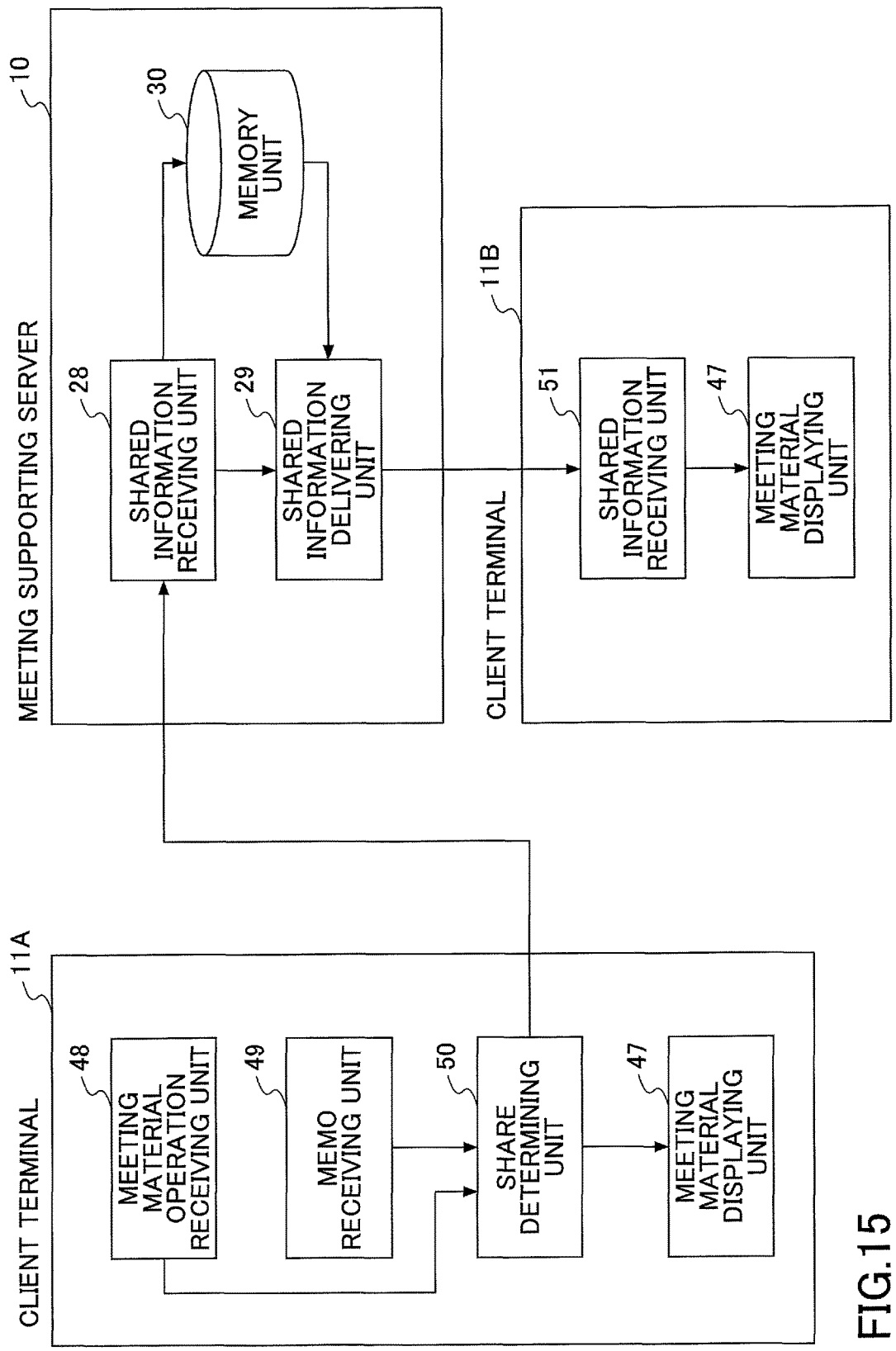
FIG. 15 is an exemplary chart of an edit process.

FIG. 15 is an exemplary chart of an edit process. FIG. 15 explains process flows for the client terminal 11A of receiving an operation of the meeting material such as turning of the page of the meeting material, writing the memo on the meeting material, or the like from the organizer and/or the participant and for the client terminal 11B of reflecting the operation, the writing the memo, or the like on the meeting material displaying the received shared information received from the meeting supporting server 10.

The meeting material operation receiving unit 48 of the client terminal 11A receives the operation such as turning of pages or the like from the organizer of the meeting or the participants of the meeting. The memo receiving unit 49 receives the written memo or the like given onto the meeting material by the organizer and/or the participant of the meeting.

The share determining unit 50 determines whether the operation of the meeting material, the written memo on the meeting material, or the like is shared information which is required to be shared by the organizer and/or the participant. For example, the operation of turning the page by the presenter of the meeting is determined to be the shared information which is required to be shared. The operation given by the participant other than the presenter is not determined to be the shared information to be shared.

If the written memo given by the presenter of the meeting onto the meeting material is a shared memo, the written memo is determined to be the shared information to be shared. If the written memo given by the presenter of the meeting onto the meeting material is an individual memo, the written memo is not determined to be the shared information to be shared. If the written memo is given by a participant other than the presenter of the meeting onto the meeting material, the written memo is not determined to be the shared information to be shared.

When the share determining unit 50 determines that the written memo is the shared information, the share determining unit 50 sends the written memo to the meeting supporting server 10 as the shared information. The share determining unit 50 reflects the operation such as turning of the page of the meeting material, writing of the memo, or the like on the meeting material displayed by the meeting material displaying unit 47. Said differently, the meeting material displaying unit 47 of the client terminal 11A reflects the operation such as turning of the page of the meeting material, the written memo on the meeting material, or the like by the organizer and/or the participant and displays the reflected meeting material.

The shared information receiving unit 28 receives shared information such as an operation of the meeting material from the client terminal 11A, a written memo given onto the meeting material from the client terminal 11A, or the like from the client terminal 11A. When it is necessary to update the display control information, the shared information receiving unit 28 updates the display control information, if necessary. The display control information is updated when the page is turned over, for example. The shared information receiving unit 28 stores a handwritten memo data in the memory unit 30 when the shared information is the shared memo.

The shared information delivering unit 29 refers to a participant other than the presenter with reference to the display control information and sends the shared information to another client terminal 11B operated by the participant other than the presenter. The shared information receiving unit 51 of the client terminal 11B reflects the operation of the meeting material, the written memo, or the like on the meeting material displayed by the meeting material displaying unit 47 based on the received shared information received from the meeting supporting server 10.

Figure 16:
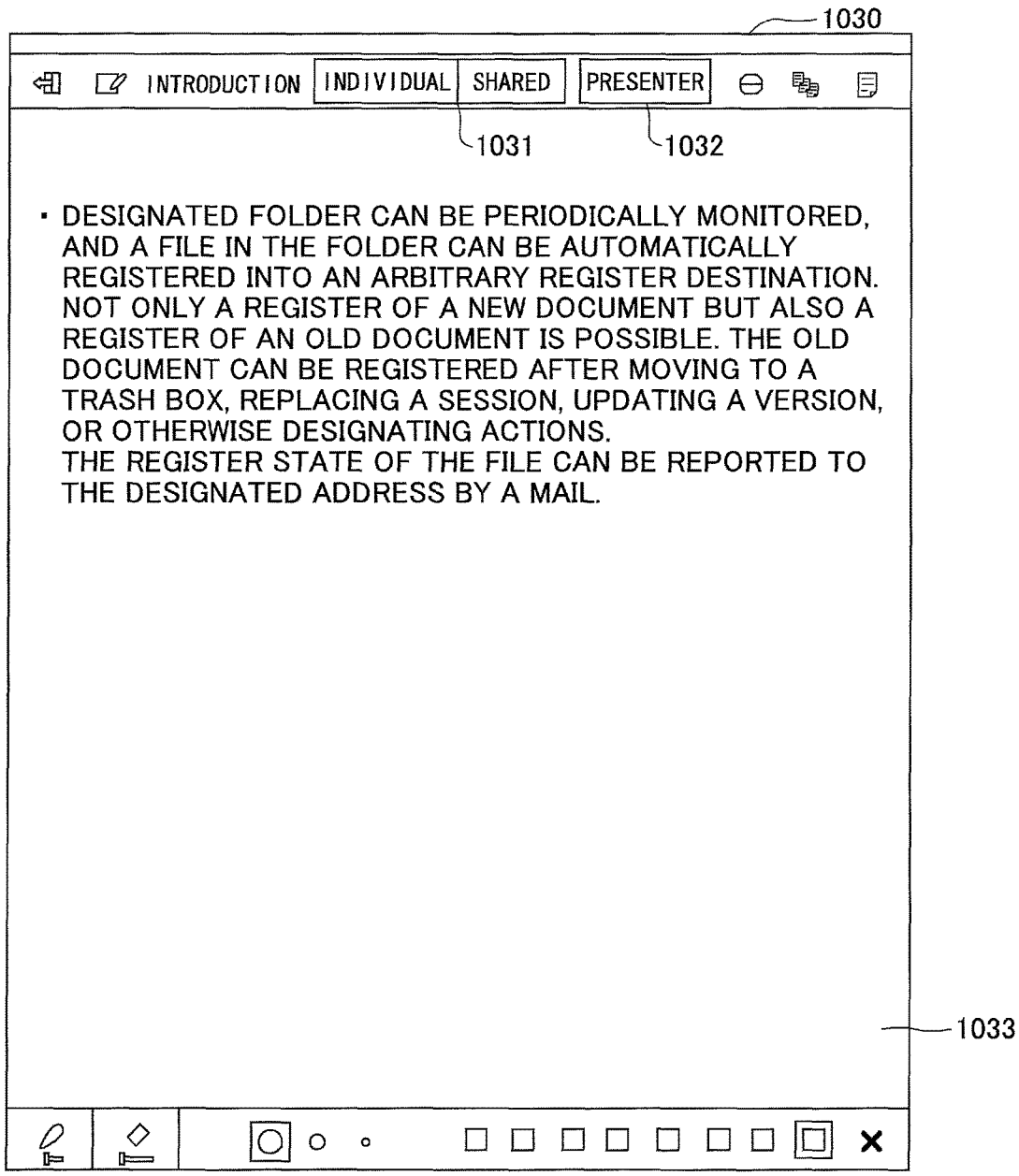
FIG. 16 illustrates an image of a viewing screen of a client terminal by which a meeting material is displayed.

For example, before the client terminals 11A and 11B receive the operation such as turning of the page, the written memo, or the like given by the presenter or the participant onto the meeting material, the client terminals 11A and 11B display the meeting material received from the meeting supporting server 10 as illustrated in, for example, FIG. 16. FIG. 16 illustrates an image of a viewing screen of the client terminal 11, by which a meeting material is displayed.

The viewing screen 1030 of FIG. 16 includes a switch button 1031 for switching between the individual memo and the shared memo, a request button 1032 for requesting a replacement of the presenter, and a display column 1033 for displaying the meeting material. The presenter of the meeting can perform an operation such as a turn of the page of the meeting material or writing of an individual memo or a shared memo on the meeting material using the viewing screen 1030. Further, the participant other than the presenter of the meeting can write an individual memo on the meeting material using the viewing screen 1030.

Figure 17:
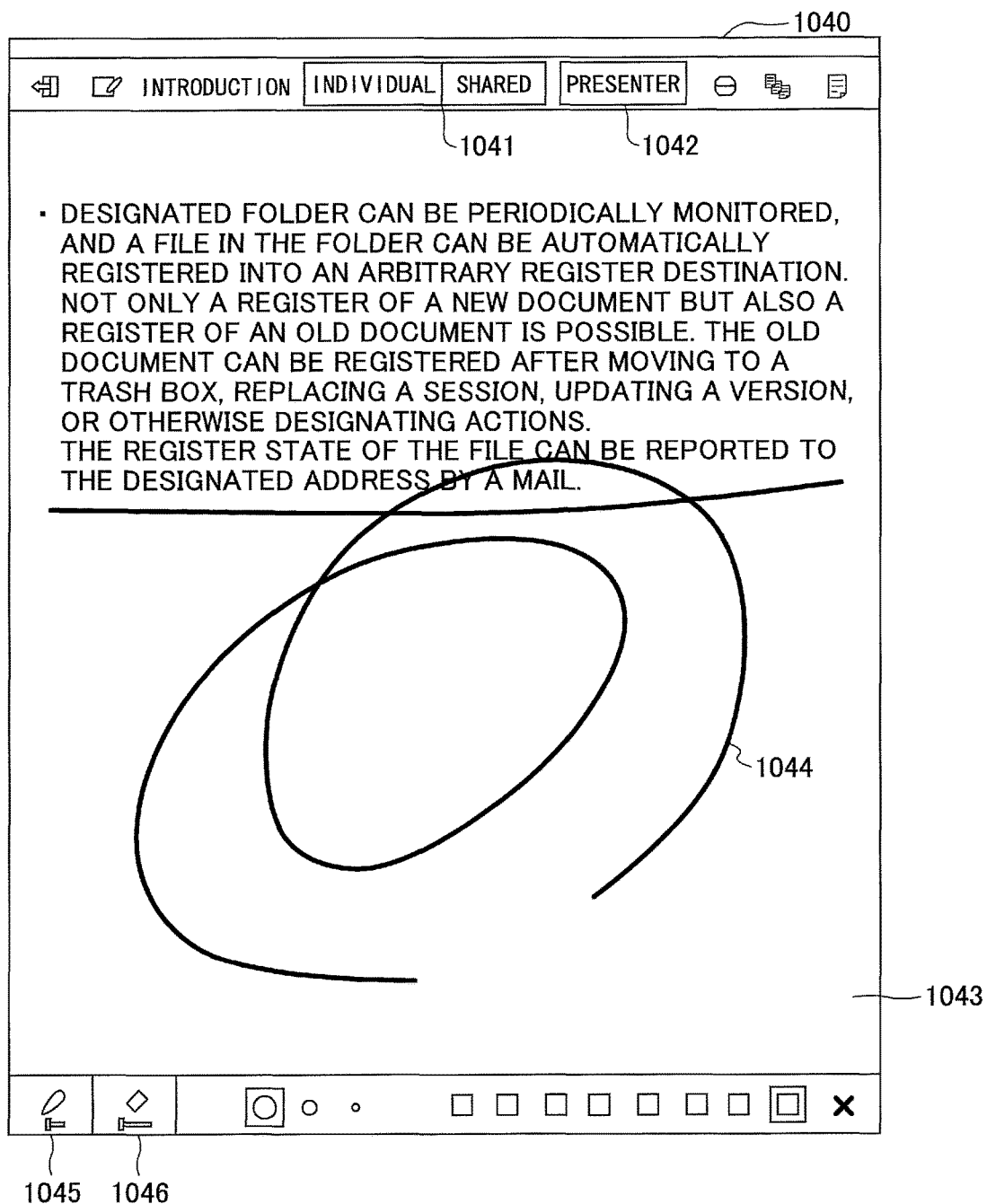
FIG. 17 is another exemplary image chart of the viewing screen of the client terminal by which the meeting material is displayed.

Further, after the client terminal 11A receives the written memo given by the presenter or the participant onto the meeting material, the client terminal 11A displays the meeting material as illustrated in, for example, FIG. 17. FIG. 17 illustrates another exemplary image of the viewing screen of the client terminal, by which the meeting material is displayed. The viewing screen 1040 illustrated in FIG. 17 is formed by adding a written memo 1044 to the meeting material on the viewing screen 1030 illustrated in FIG. 16.

If the written memo 1044 is the shared memo, the client terminal 11A sends the shared information corresponding to the written memo 1044 to the meeting supporting server 10. The client terminal 11B can display the meeting material including the written memo 1044 as illustrated in FIG. 17 in a manner similar to the client terminal 11A by receiving the shared information corresponding to the written memo 1044 from the meeting supporting server 10.

Figure 18:
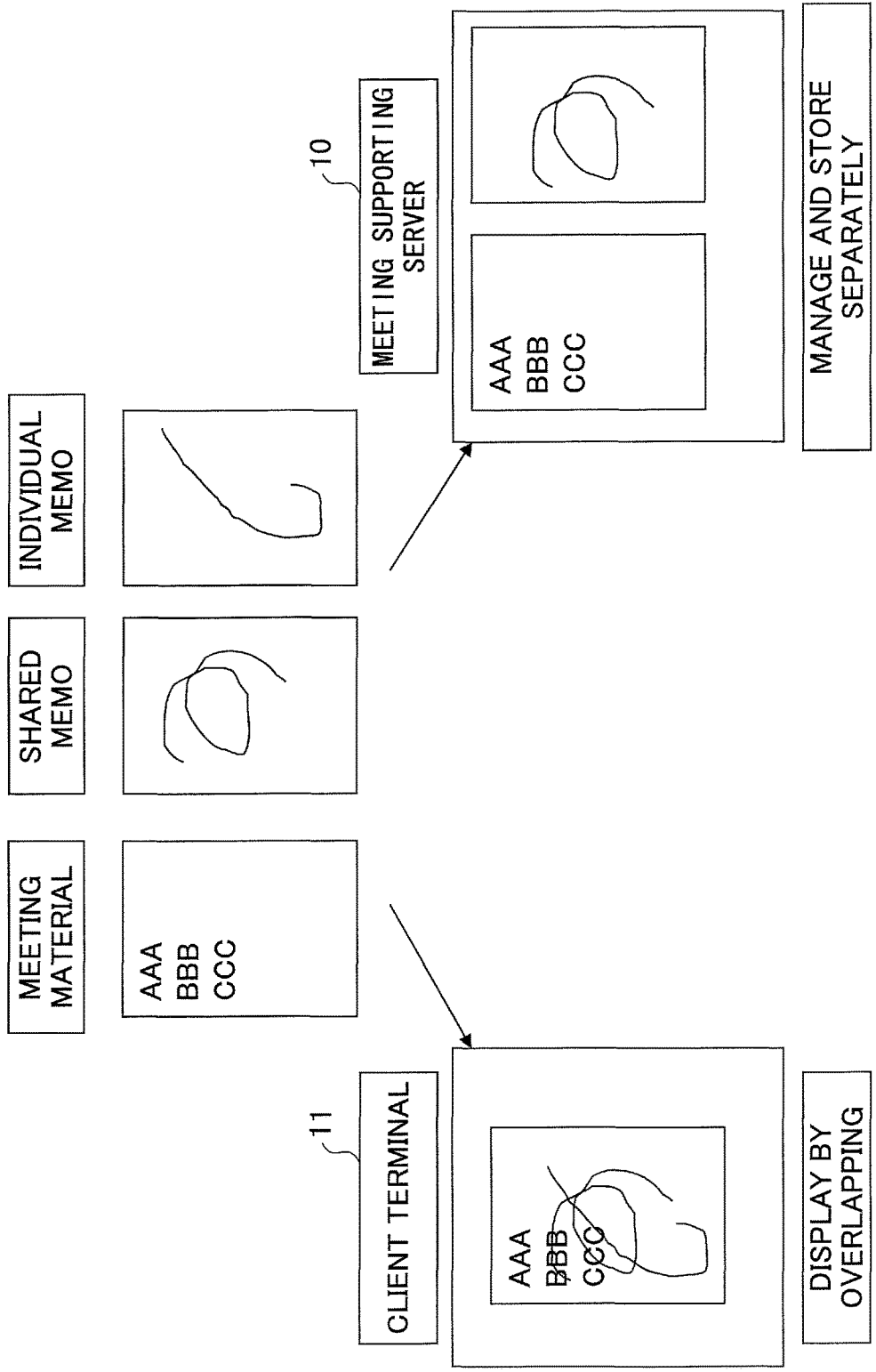
FIG. 18 is an exemplary chart illustrating a meeting material and a written memo.

FIG. 18 is an exemplary chart illustrating a meeting material and a memo. An individual memo is stored in the client terminal 11. The meeting supporting server 10 stores and manages the shared memo. The meeting supporting server 10 stores and manages the meeting material and the shared memo as different data.

When the meeting is reopened, the meeting supporting server 10 sends the meeting material and the shared memo to the client terminal 11. When the shared memo is sent, the type defined by InkML is used. InkML is provided to describe a handwritten data using an XML data. Recommended specifications of InkML are recommended by W3C.

When the meeting is reopened, the meeting material, onto which the individual memo and the shared memo added (overlapped), is initially displayed on the client terminal 11. Because the meeting supporting server 10 stores and manages the meeting material and the shared memo as different data in the electronic meeting system 1 of the embodiment, the process of deleting or rewriting the shared memo added in the previous opening of the meeting becomes easy.

FIG. 19 is an exemplary structural view of a handwritten memo data. The handwritten memo data includes a material ID, an X coordinate value, a Y coordinate value, a line ID, a page number, or the like. The handwritten memo data are managed by the memory unit 30. Each point forming the handwritten memo data corresponds to one record managed by the memory unit 30. The point is, for example, a pixel on the display screen. When the line IDs of the points are the same, the points having the same line IDs form a continuous line. Referring to FIG. 17, in the individual memo and/or the shared memo, when a line of the written memo 1044 drawn by a pen 1045 crosses a trajectory of an eraser 1046, the line of the written memo is deleted. The handwritten memo data is associated with the meeting material by the material ID.

When the meeting material is displayed on the viewing screen 1040, the meeting supporting server 10 reads the handwritten data associated with the material ID of the meeting material from the memory unit 30 and sends the handwritten memo data along with the meeting material to the client terminal 11 thereby enabling displaying the meeting material, to which the shared memo is added.

In the edit process illustrated in FIG. 15, the electronic meeting system 1 of the embodiment shares the meeting material in the client terminal 11 of the presenter or the participant. For example, when the presenter turns a page of the meeting material on the screen of the client terminal 11, the page of the meeting material is synchronously turned on the screen of the meeting material. When the presenter additionally writes a shared memo onto the meeting material displayed on the screen of the client terminal 11, the shared memo on the meeting material is synchronously displayed on the screen of the meeting material.

Figure 20:
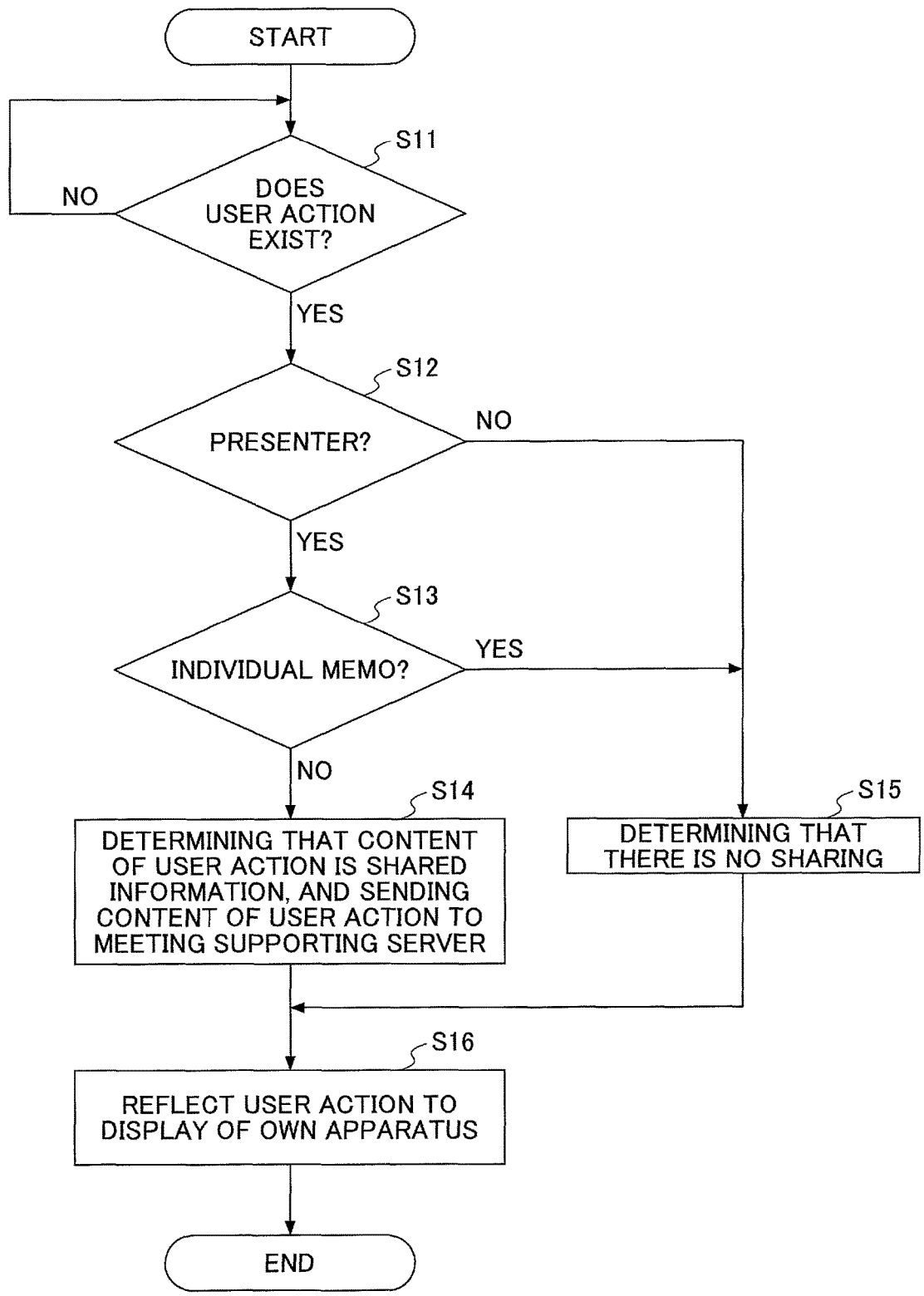
FIG. 20 is an exemplary flowchart of a share determining process.

Further, a share determining process performed by the share determining unit 50 is described. FIG. 20 is an exemplary flowchart of the share determining process.

In step S11, the share determining unit 50 repeats the process of step S11 until an action by the user such as an operation of turning a page of the meeting material or an action by the user of writing a memo is received. When there occurs the action by the user, the process goes to step S12. Then, the share determining unit 50 determines whether the user is the presenter.

When the user is the presenter, the share determining unit 50 proceeds to step S13 and determines whether the action by the user is writing of the individual memo. If the action by the user is not writing of the individual memo, said differently, if the action by the user is writing of the shared memo or an operation of turning a page of the meeting material, the share determining unit 50 proceeds to step S14 and determines that the content of the action by the user is the shared information. Then, the content of the action determined to be the shared information is sent to the meeting supporting server 10. Thereafter, the process goes to step S16. In step S16, the share determining unit 50 reflects the action by the user on the display of the client terminal 11.

If the user is not the presenter in step S12 or the individual memo is written in step S13, the share determining unit 50 determines that there is no sharing in step S15. After step S15, the process goes to step S16. In step S16, the share determining unit 50 reflects the action by the user on the display of the client terminal 11.

By the share determining process illustrated in FIG. 20, the action by the user which is required to be shared by the organizer or the participant is determined as the shared information.

<General Overview>

In the electronic meeting system 1, the meeting can be reopened. Therefore, it is sufficient to register only single meeting information even if proceedings of the meeting are continuously opened and closed. Further, in the electronic meeting system 1 of the embodiment, the meeting can be reopened based on meeting information of the closed meeting. Therefore, the meeting material, to which the memo or the like is added in the closed meeting, can be easily used in the reopened meeting.

The client terminal 11 may substantialize a display such as a viewing screen by using a WEB browser or dedicated application software. In a case where the dedicated application software is used, a user interface (UI) can be designed to effectively use the screen of the client terminal 11 having a small screen size such as a tablet PC or a smartphone, for example.

According to the embodiment of the present invention, a meeting can be reopened based on meeting information of an ended meeting.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus has been described in detail, it should be understood that various changes, substitutions, and alterations could be made thereto without departing from the spirit and scope of the invention.

What is claimed is:

1. A meeting system that facilitates sharing of meeting material data for a meeting, the meeting system comprising:
a plurality of information processing terminals, each information processing terminal having a display; and
a server that communicates with at least one of the information processing terminals via a network, the server including a processor and a memory storing the meeting material data, wherein the processor implements processes of:
sending the meeting material data to one information processing terminal from among the plurality of information processing terminals for the meeting selected by the one information processing terminal;
receiving handwritten data that is added to the meeting material data via the display of the one information processing terminal while the one information processing terminal participates in the meeting, the handwritten data being sent to another information processing terminal from among the information processing terminals participating in the meeting;
storing, in the memory, the received handwritten data, which was also sent to the another information processing apparatus as shared handwritten data, in association with the meeting material data, wherein the shared handwritten data includes coordinate values indicating a position at which handwriting is added within the meeting materials;
designating the meeting as a resumable meeting if an elapsed time of the meeting is within a predetermined time;
generating first screen data to be displayed on the display of a requesting information processing terminal to enable selection of the resumable meeting by a user via the display of the requesting information processing terminal;
sending the generated first screen data to the requesting information processing terminal; and
receiving a request for the meeting material data of the meeting selected by the requesting information processing terminal from among a view of an openable meeting or the resumable meeting, wherein
the server
sends the meeting material data with the shared handwritten data stored in the memory to the requesting information processing terminal in a case where the requested meeting material data is of the resumable meeting and the handwritten data associated with the meeting material data is stored in the memory as the shared handwritten data, and
sends the meeting material data to the requesting information processing terminal without the shared handwritten data in a case where the requested meeting material data is not the material data of the resumable meeting,
the meeting material data reflecting the handwriting corresponding to the shared handwritten data is displayed at the requesting information processing terminal based on the coordinate information included in the shared handwritten data, and
in a case where the handwritten data newly added to the meeting material data being displayed in the request information processing terminal is received from the request information processing terminal displaying the meeting material data, on which the handwriting corresponding to the shared handwritten data is reflected by writing, the newly added handwritten data is sent to the another information processing terminal participating in the meeting selected from the view of the meeting.

2. The meeting system as recited in claim 1, wherein the processor further implements a process of:
adding a value that indicates a status of the meeting.

3. The meeting system as recited in claim 1,
wherein the processor further implements processes of:
determining whether the elapsed time of the meeting exceeds the predetermined time;
designating the meeting as a non-resumable meeting if the elapsed time exceeds the predetermined time and based on a value of the status of the meeting; and
deleting the meeting information of the non-resumable meeting.

4. A method that enables sharing of meeting material data over a meeting system that includes a plurality of information processing terminals, each information processing terminal having a display, and a server that communicates with at least one of the information processing terminals via a network, the server including a processor and a memory, the method comprising steps of:
sending, by the processor, the meeting material data to one information processing terminal from among the plurality of information processing terminals for the meeting selected by the one information processing terminal;
receiving, by the processor, handwritten data that is added to the meeting material data via the display of the one information processing terminal while the one information processing terminal participates in the meeting, the handwritten data being sent to another information processing terminal from among the information processing terminals participating in the meeting;
storing, in the memory, the received handwritten data, which was also sent to the another information processing apparatus as shared handwritten data, in association with the meeting material data, wherein the shared handwritten data includes coordinate values indicating a position at which handwriting is added within the meeting materials;
designating, by the processor, the meeting as a resumable meeting if an elapsed time of the meeting is within a predetermined time;
generating, by the processor, first screen data to be displayed on the display of a requesting information processing terminal to enable selection of the resumable meeting via the display of the requesting information processing terminal;
sending, by the processor, the generated screen data to the requesting information processing terminal; and
receiving a request for the meeting material data of the meeting selected by the requesting information processing terminal from among a view of an openable meeting or the resumable meeting, wherein
the server
sends the meeting material data with the shared handwritten data stored in the memory to the requesting information processing terminal in a case where the requested meeting material data is of the resumable meeting and the handwritten data associated with the meeting material data is stored in the memory as the shared handwritten data, and
sends the meeting material data to the requesting information processing terminal without the shared handwritten data in a case where the requested meeting material data is not the material data of the resumable meeting,
the meeting material data reflecting the handwriting corresponding to the shared handwritten data is displayed at the requesting information processing terminal based on the coordinate information included in the shared handwritten data, and in a case where the handwritten data newly added to the meeting material data being displayed in the request information processing terminal is received from the request information processing terminal displaying the meeting material data, on which the handwriting corresponding to the shared handwritten data is reflected by writing, the newly added handwritten data is sent to the another information processing terminal participating in the meeting selected from the view of the meeting.

5. A computer-readable, non-transitory recording medium containing program instructions that enable sharing of meeting material data over a meeting system that includes a plurality of information processing terminals, each information processing terminal having a display, and a server that communicates with at least one of the information processing terminals via a network, the server and including a processor and a memory, wherein execution of the program causes the processor to implement processes of:

sending, by the processor, the meeting material data to one information processing terminal from among the plurality of information processing terminals for the meeting selected by the one information processing terminal;

receiving, by the processor, handwritten data that is added to the meeting material data via the display of the one information processing terminal while the one information processing terminal participates in the meeting, the handwritten data being sent to another information processing terminal from among the information processing terminals participating in the meeting;

storing, in the memory, the received handwritten data, which was also sent to the another information processing apparatus as shared handwritten data, in association with the meeting material data, wherein the shared handwritten data includes coordinate values indicating a position at which handwriting is added within the meeting materials;

designating the meeting as a resumable meeting if an elapsed time is within a predetermined time;

generating first screen data to be displayed on the display of a requesting information processing terminal to enable selection of the resumable meeting via the display of the requesting information processing terminal;

sending, by the processor, the generated screen data to the requesting information processing terminal; and receiving a request for the meeting material data of the meeting selected by the requesting information processing terminal from among a view of an openable meeting or the resumable meeting, wherein the server
sends the meeting material data with the shared handwritten data stored in the memory to the requesting information processing terminal in a case where the requested meeting material data is of the resumable meeting and the handwritten data associated with the meeting material data is stored in the memory as the shared handwritten data, and
sends the meeting material data to the requesting information processing terminal without the shared handwritten data in a case where the requested meeting material data is not the material of the resumable meeting, the meeting material data reflecting the handwriting corresponding to the shared handwritten data is displayed at the requesting information processing terminal based on the coordinate information included in the shared handwritten data, and in a case where the handwritten data newly added to the meeting material data being displayed in the request information processing terminal is received from the request information processing terminal displaying the meeting material data, on which the handwriting corresponding to the shared handwritten data is reflected by writing, the newly added handwritten data is sent to the another information processing terminal participating in the meeting selected from the view of the meeting.

6. The meeting system as recited in claim 1, wherein
in a case where sharing status information indicates that the handwritten data is sharing-not-required, the handwritten information is reflected only in the meeting material data displayed at the one information processing terminal.

7. The meeting system as recited in claim 1, wherein the meeting information further includes at least one of a meeting start time and a meeting identification.

8. The meeting system as recited in claim 2,
wherein the added value indicating the status of the meeting is an ending time of the meeting, and the designation of the meeting as a resumable meeting is additionally based on the ending time of the meeting.

9. The method as recited in claim 4, wherein the meeting information further includes at least one of a meeting start time and a meeting identification.

10. The method as recited in claim 4 further comprising: adding a value that indicates a status of the meeting.

11. The computer-readable, non-transitory recording medium containing program instructions as recited in claim 5, wherein the stored meeting information further includes at least one of a meeting start time and a meeting identification.

12. The computer-readable, non-transitory recording medium containing program instructions as recited in claim 5, wherein execution of the program causes the processor to further implement a process of:
adding a value that indicates a status of the meeting.

13. The meeting system as recited in claim 6, wherein the sharing status information includes user status information indicating a user status of the user adding the handwritten data as a presenter or a participant, and handwritten data added by the user having the user status of the presenter is designated as sharing-required.

14. The method as recited in claim 4, wherein
in a case where sharing status information indicates that the handwritten data is sharing-not-required, the handwritten information is reflected only in the meeting material data displayed at the one information processing terminal, wherein
the sharing status information includes user status information indicating a user status of the user adding the handwritten data as a presenter or a participant, in which
the handwritten data added by the user having the user status of the presenter is designated as sharing-required, and
the handwritten data added by the user having the user status of the participant is designated as sharing-not-required.

15. The computer-readable, non-transitory recording medium containing program instructions as recited in claim 5, wherein
in a case where the sharing status information indicates that the handwritten data is sharing-not-required, the handwritten information is reflected only in the meeting material displayed at the one information processing terminal where the operation originated,
the sharing status information includes user status information indicating a user status of the user adding the handwritten data as a presenter or a participant, in which
the handwritten data added by the user having the user status of the presenter is designated as sharing-required, and
the handwritten data added by the user having the user status of the participant is designated as sharing-not-required.

16. The meeting system as recited in claim 1, wherein the processor further implements processes of:
determining whether the elapsed time of the meeting is within the predetermined time based on meeting status information included in the stored meeting information.

17. The meeting system as recited in claim 1, wherein
the handwritten data further includes at least one of meeting material identification information, line identification information, and a page number of the meeting material at which the handwritten data is to be displayed.

18. The method as recited in claim 4, wherein
the handwritten data further includes at least one of meeting material identification information, line identification information, and a page number of the meeting material at which the handwritten data is to be displayed.

19. The computer-readable, non-transitory recording medium containing program instructions as recited in claim 5, wherein
the handwritten data further includes at least one of meeting material identification information, line identification information, and a page number of the meeting material at which the handwritten data is to be displayed.

* * * * *